(12) United States Patent
Rider

(10) Patent No.: US 9,256,270 B2
(45) Date of Patent: Feb. 9, 2016

(54) PLATFORM POWER MANAGEMENT FOR BUILDING WIDE CONTROL OF POWER FACTOR AND HARMONICS

(75) Inventor: Scott M. Rider, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 13/991,747

(22) PCT Filed: Dec. 29, 2011

(86) PCT No.: PCT/US2011/067705
§ 371 (c)(1),
(2), (4) Date: Jun. 5, 2013

(87) PCT Pub. No.: WO2013/101017
PCT Pub. Date: Jul. 4, 2013

(65) Prior Publication Data
US 2014/0215238 A1    Jul. 31, 2014

(51) Int. Cl.
*G06F 1/32* (2006.01)
*H02M 1/42* (2007.01)

(52) U.S. Cl.
CPC ............ *G06F 1/3206* (2013.01); *G06F 1/3234* (2013.01); *H02M 1/4208* (2013.01); *Y02B 70/126* (2013.01)

(58) Field of Classification Search
CPC ... G06F 1/3206; G06F 1/3234; H02M 1/4208
See application file for complete search history.

(56) References Cited

U.S. PATENT DOCUMENTS

| 7,697,354 B2* | 4/2010 | Brede et al. ................... 365/200 |
| 8,412,973 B1* | 4/2013 | Denton et al. ................ 713/340 |
| 8,995,858 B2* | 3/2015 | Watanabe ....................... 399/69 |

FOREIGN PATENT DOCUMENTS

| JP | 11-098693 A | 4/1999 |
| JP | 11098693 A * | 4/1999 |

OTHER PUBLICATIONS

"PCT Notification of Transmittal of the International Search Report and the Written Opinion of the International Searching Authority, or the Declaration", dated Sep. 28, 2012, for International Application No. PCT/US2011/067705, 9pgs.
"Notification Concerning Transmittal of International Preliminary Report on Patentability Chapter 1 of the Patent Cooperation Treaty", Jul. 10, 2014, for International Application No. PCT/US2011/067705, 6pgs.

* cited by examiner

*Primary Examiner* — Stefan Stoynov
(74) *Attorney, Agent, or Firm* — Buckley, Maschoff & Talwalkar LLC

(57) ABSTRACT

Example embodiments of an apparatus to reduce power consumed by a processor include a timing signal block configured to be coupled to measure the magnitude of an alternating current voltage signal supplied to a processor and to assert a timing signal when the magnitude of the alternating current voltage signal is about equal to zero volts and a throttling block configured to be coupled to the processor, to receive the timing signal and to assert a throttling signal that causes processor speed to be reduced so that processor power consumption is reduced in phase with the alternating current voltage signal and harmonic distortion of a current waveform supplied to the processor is reduced.

19 Claims, 6 Drawing Sheets

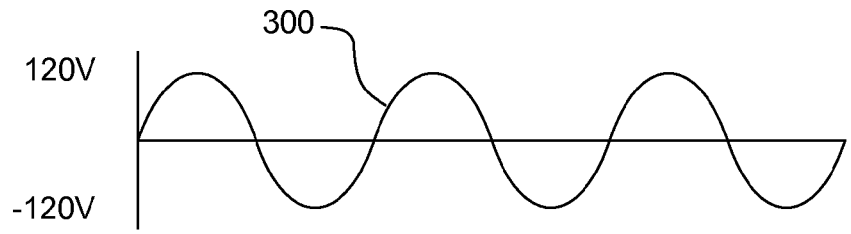
Input power, 120 V a.c.
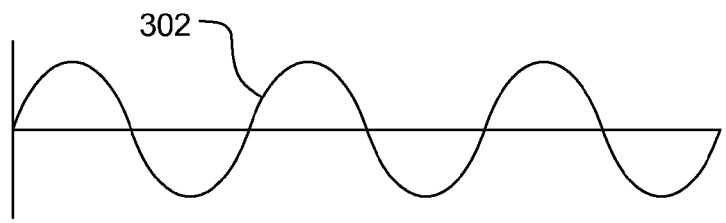
Input current, resistive load
FIG. 3A
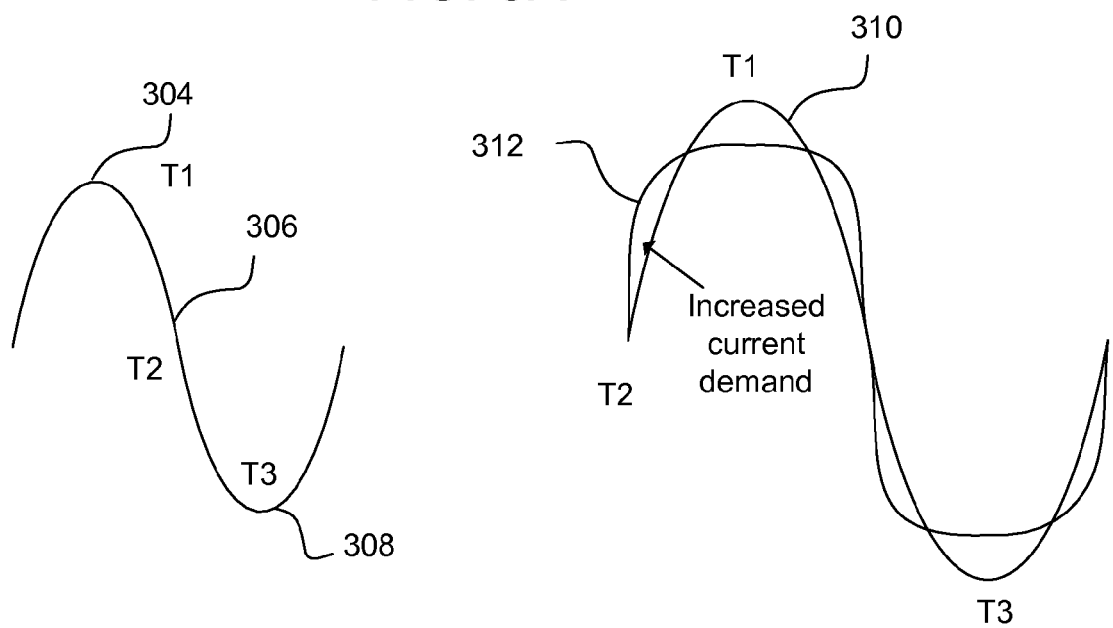
FIG. 3B    FIG. 3C a
PLATFORM POWER MANAGEMENT FOR BUILDING WIDE CONTROL OF POWER FACTOR AND HARMONICS

BACKGROUND OF THE INVENTION

Switched Mode Power Supplies (SMPSs), such as those used in computer systems, receive an alternating current (AC) voltage signal that has a sinusoidal waveform at a fundamental frequency. Generally, for reasons described more fully below, SMPSs supply an AC load current signal that does not have a sinusoidal waveform. These non-sinusoidal waveforms include harmonics at multiples of the fundamental frequency and cause harmonic distortion to occur. A harmonic at twice the fundamental frequency is called a second harmonic and a harmonic at three times the fundamental frequency is called a third harmonic.

When the current waveform is not sinusoidal the power factor of a power supply is less than 100%. A typical SMPD has a power factor of around 60%, therefore having considerable odd-order harmonic distortion (sometimes with the magnitude of the third harmonic as large as the magnitude of the fundamental).

The presence of third harmonic distortion causes an increase in operating temperature of the generation facility, which reduces the life of equipment including rotating machines, cables, transformers, capacitors, fuses, switching contacts, and surge suppressors. Third harmonic distortion also causes additional losses and dielectric stresses in capacitors and cables, increasing currents in windings of rotating machinery and transformers and noise emissions in many products, and bring about early failure of fuses and other safety components.

Power factor correction devices may be provided with active or passive components. Typically these devices use a bulk capacitor to supply current when the value of a sinusoidal voltage waveform is low to provide a nearly constant level of power at a fixed direct current (DC) voltage level.

BRIEF DESCRIPTION OF THE DRAWINGS

FIG. 3A-3C are a graphs depicting example voltage and current waveforms.

DETAILED DESCRIPTION OF EXAMPLE EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Figure 1:
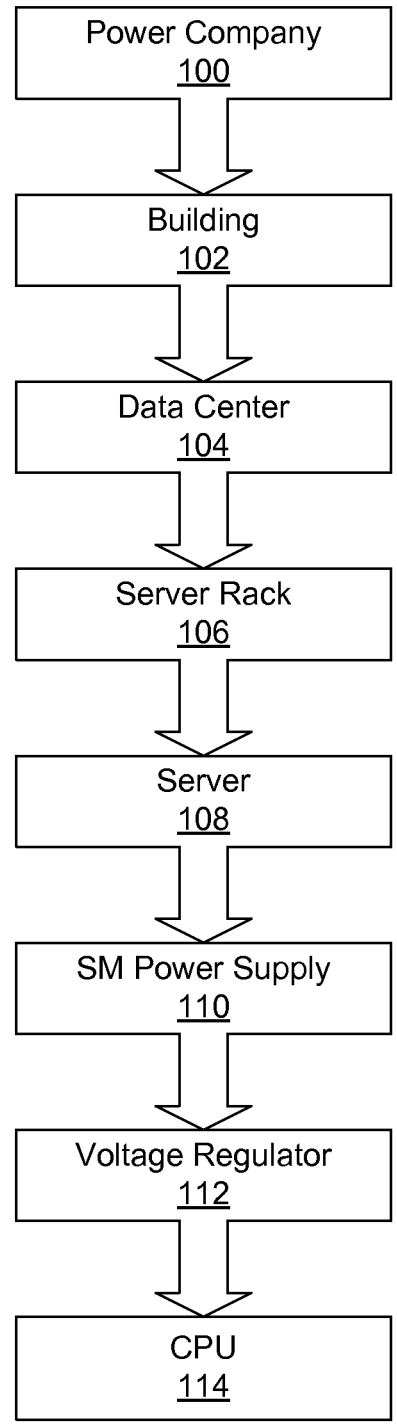
FIG. 1 is a block diagram of an example power delivery system.

FIG. 1 shows a typical power delivery system, i.e., a distributed power network, depicting the distribution of power from the power company to the CPU in a computer. Although a server is shown in FIG. 1, the description is meant to be an illustration and not a limitation. The same concepts apply equally to other types of computers such as workstations or desktop computers.

The power company 100 delivers power to many buildings. The power may be supplied in single or multiple phases, as 120 Volts or 240 Volts or as other voltage and phase combinations that may change by region. A building 102 distributes power to one or more data centers 104. A data center 104 is a room with computer equipment in it, which usually consists of multiple server racks 106. A server rack 106 is an enclosure with multiple servers 108 connected to it. A server 108 is a class of computer usually optimized to handle large amounts of data. Inside the server is a switch mode power supply 110 that converts the 120 Volt or 240 Volt AC input power to lower voltage direct current (DC) voltage, such as 12 Volts. The 12 voltage is further regulated by a voltage regulator 112 down to the voltage that the CPU 114 needs, perhaps 1 volt.

Figure 2:
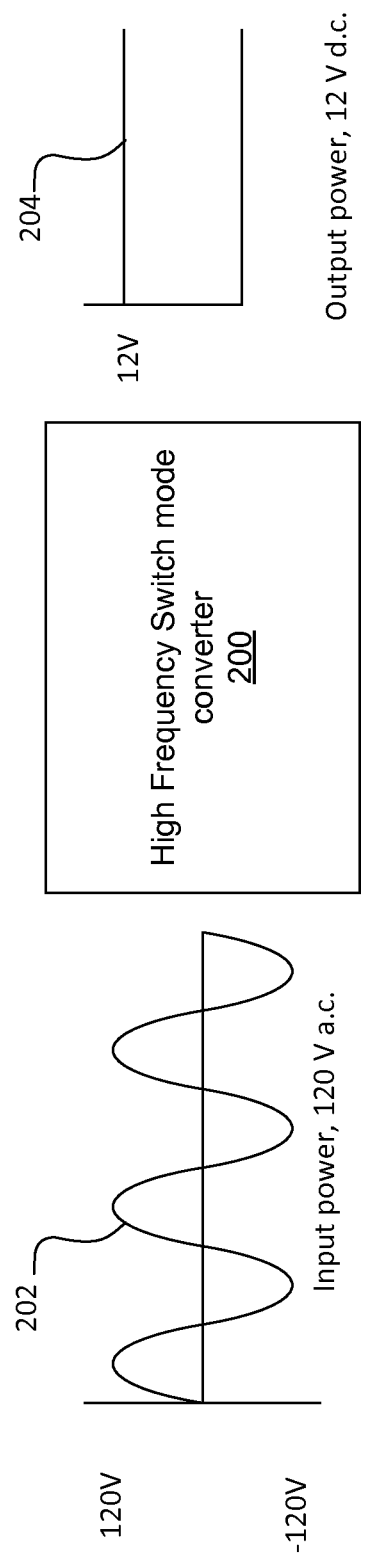
FIG. 2 is a block diagram of a switch mode power supply.

FIG. 2 depicts a switch mode power supply (SMPS) 200 that converts the incoming 120V AC voltage 202 to 12V DC voltage 204. Only 12V DC is shown for clarity, however actual SMPSs supply several different voltages to the computer. Showing a simplified power supply that only has a 12 Volt output is intended as an illustration and not a limitation.

FIG. 3A shows the relationship between the voltage waveform 300 and the current waveform 302 for a purely resistive load. In this case, the voltage and current have sinusoidal waveforms which are in phase and the power, which is the product of voltage and current, i.e., P=VI, is a maximum because as the voltage signal increases and decreases the current signal also increases and decreases in direct proportion. Therefore, the power factor for a purely resistive load is the maximum power factor of 100%.

Turning to FIG. 3B, the resistor dissipates the most power during the time the voltage is near its peak at times T1 304 and T3 308 because the product of the voltage and current magnitudes are at a maximum at that time, and the resistor dissipates the least power during the time when voltage and current cross the horizontal axis at time T2 306 because at that time both the voltage and current have zero magnitude.

Unlike a pure resistive load powered by an alternating current power source, a computer has a nearly constant demand for power. The product of the current and voltage magnitudes must be constant to output constant power. FIG. 3B depicts the current waveform that is generated when the voltage waveform is sinusoidal. Note that, in order to supply constant power, at time T1, when the AC voltage is at a maximum, the amount of current needed is lower than when the AC voltage is very near zero at time T2.

The distorted current waveform depicted in FIG. 3C is caused by the need to supply more current when the AC voltage level is low to maintain a constant power output and results in a distorted current signal that does not have a sinusoidal waveform and includes a high content of third harmonics of the fundamental waveform.

Conventional SMPSs include a bulk capacitor that provides the excess current required when the AC voltage level is low.

Figure 4:
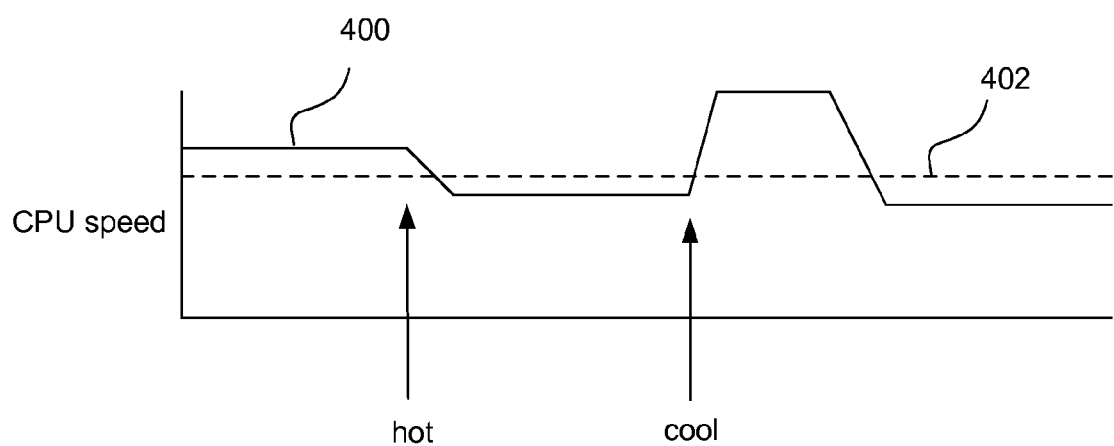
FIG. 4 is a graph depicting CPU clock speed in a standard CPU throttling environment.

FIG. 4 shows how throttling functions in a typical computer utilizing a conventional throttling system. The CPU changes speed depending on, amongst other factors, whether its operating temperature is high. The CPU speed 400 varies from going above a nominal speed 402 when its operating temperature is low or going below the nominal speed 402 when its operating temperature is high. When the CPU is detected to be "hot", the clock speed is lowered until it is detected to be cool. When the CPU is cool, it is allowed to run momentarily above the nominal speed.

CPUs manufactured by the assignee of the present application may be throttled by asserting a CPU_HOT signal which forces CPU throttling. Other CPUs may respond to a thermal alert signal which request throttling.

Figures 5A, 5B:
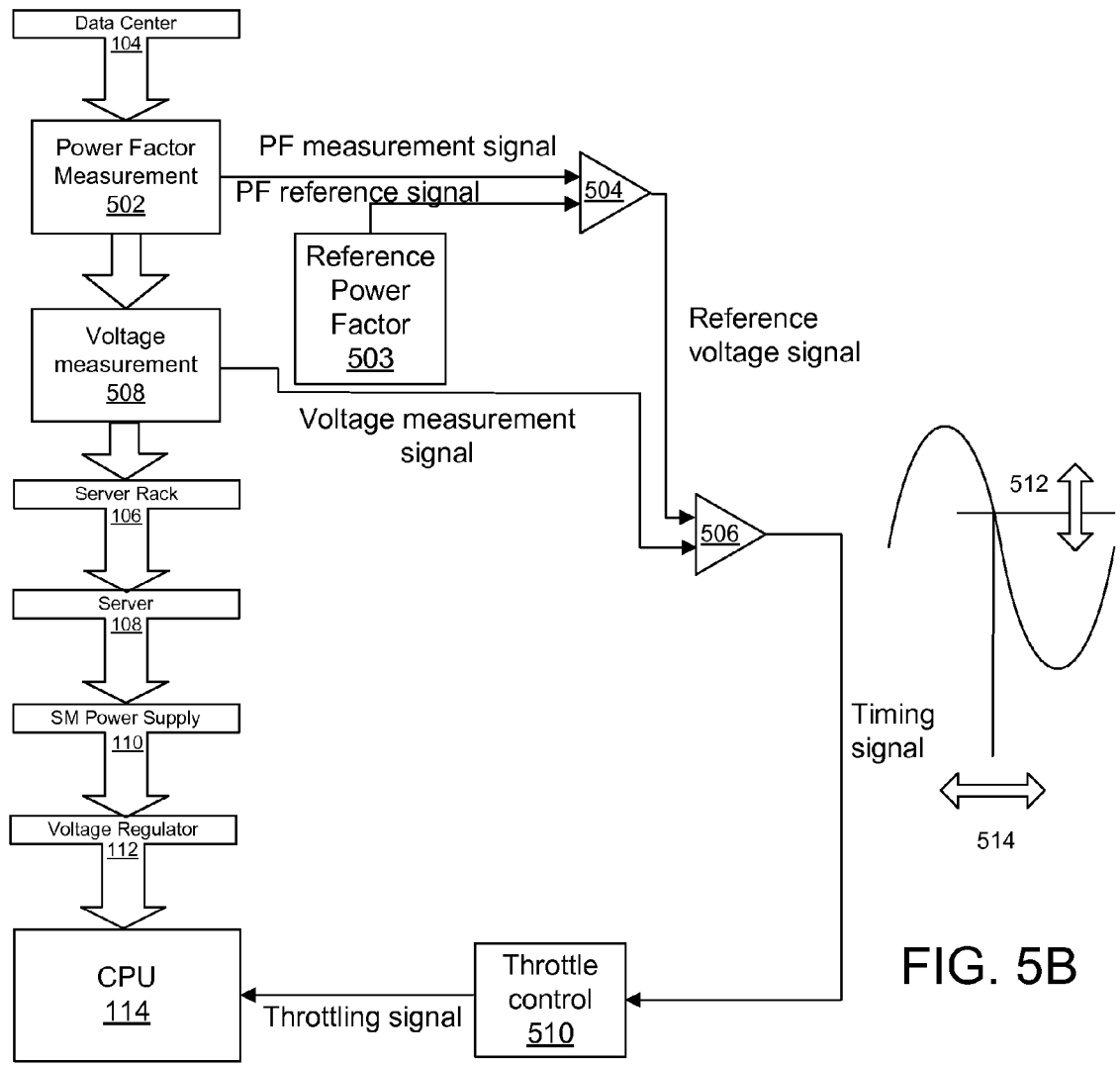
FIG. 5A is a block diagram of an example embodiment.
FIG. 5B is a graph illustrating the operation of an example embodiment.

An example embodiment is shown in FIG. 5A. FIG. 5A includes blocks depicted in FIG. 1 with additional blocks inserted to implement functionality to reduce third harmonic distortion.

In FIG. 5A a Power Factor Measurement block 502 is inserted into the power delivery system of FIG. 1 and measures the actual power factor when power is supplied to the CPU. As is well-known in the art, one measure of the power factor is the cosine of the phase shift angle between the voltage and current waveforms. The power factor is also reduced if the current has a waveform that is distorted from a pure sinusoidal waveform. The output of the Power Factor Measurement block 502 is a power factor measurement signal coupled to a first input of a first comparator 504. The output of a Reference Power Factor block 503 is a power factor reference signal coupled to the second input of the first comparator 504.

The output of the first comparator 504 is a reference voltage signal coupled to a first input of a second comparator 506. A Voltage Measurement block 508 is inserted into the power delivery system of FIG. 1 and measures the amplitude of the AC voltage signal. The output of the Voltage Measurement block is an AC voltage magnitude signal coupled to the second input of the second comparator 506.

The output of the second comparator 506 is a timing signal coupled to the input of a Throttle Control block 510 and the output of the Throttle Control block is a throttling signal coupled to the CPU_HOT input of CPU 114.

The operation of the system depicted in FIG. 5A will now be described with reference to FIG. 5B. When the measured power factor is different than the reference power factor the first comparator 504 outputs the reference voltage signal having a magnitude determined by the difference of the magnitude of the reference power factor and the measured power factor. The magnitude of the reference voltage signal is depicted as the vertical arrow 512 in FIG. 5B.

The reference voltage signal is compared to the magnitude of AC voltage in the second comparator 506. When the magnitude of the AC voltage is equal to the reference voltage level the second comparator 506 asserts the timing signal which is received at the input of the Throttle Control block 510. The time of assertion of the timing signal is depicted by the horizontal arrow 514 in FIG. 5B.

In this example, the Throttle Control block 510 asserts the throttling signal when the magnitude of the AC signal is equal to the magnitude of the reference voltage signal. Thus, as depicted in FIG. 5B, the magnitude of the reference voltage signal determines a set-point for when the timing signal is asserted. When the reference voltage signal is low the set-point is closer to the zero crossing point of the AC voltage signal and when the reference voltage is high the set-point is closer to the peak of the AC voltage signal.

In an example embodiment, the throttling of the CPU could be initiated at a start time (TS) which occurs when the magnitude of the AC voltage signal becomes less that the reference voltage level and finished at a finish time (TF) which occurs a fixed time duration later.

Accordingly, as the reference power factor level is changed the throttling period (TF-TS) would occur earlier or later so that the throttling period would affect the actual power factor.

In the above described example embodiment analog comparators are described by way of example not limitation. Persons of ordinary skill in the art, apprised of the current disclosure, will realize that all signals may be digitally sampled and the assertion time of the timing signal may be calculated using digital processing techniques.

Figure 6:
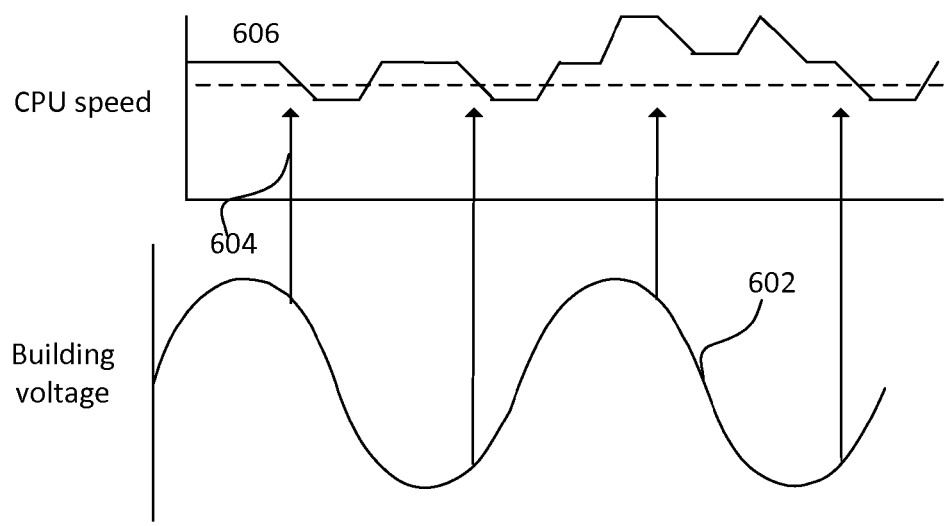
FIG. 6 is a graph depicting example CPU clock speed and building voltage resulting from employment of an example embodiment.

FIG. 6 is a graph depicting how the throttling functions when the system depicted in FIG. 5A operates. The reduction of CPU speed, which indicates the power consumption of the CPU, is compared to the AC voltage waveform 602. As described above, the throttling signals 604 are asserted when the AC voltage level is equal to the reference voltage level. As a result, the CPU power consumption 606 is reduced when the AC voltage levels are near the zero crossing points of the AC voltage waveform so that extra current does not need to be supplied at those points thereby resulting in a less distorted current waveform and lower third harmonic distortion.

Thus, unlike conventional power factor correction techniques which utilize bulk capacitors contained within the SMPS to supply current to a constant load near the AC voltage zero crossing points, the above described system reduces the power consumption of the load in phase with AC voltage zero crossing points.

The CPU throttling system described above increases the efficiency of a switch mode power supply because the current requirements during the throttling period are reduced which allows the power supply to be built with less bulk capacitance and/or to require less peak current capacity.

Another benefit of reducing current demands near the zero crossing point of the AC voltage is to reduce harmonic distortion. The features described above allow a designer to trade off bulk capacitance for distortion in order reduce harmonics, reduce distortion or reduce both harmonics and distortion.

The timing signal 604 is shown as an illustration and could be represented as a longer duration pulse or other methods could be used to synchronize throttling with the building's power. For example if the input AC voltage signal oscillates at a frequency (f) of 60 Hz then the period (T) of the signal is 16.7 milliseconds. The width of the throttling pulse could be set at a selected fraction of T.

The throttling of the CPU 114 may be triggered only by the throttling signal or could be triggered based on a number of other factors such as a specified power envelope or the heat generated by the CPU and monitored by the building or a combination of power, heat, and a signal from the building.

As illustrated, when the CPU receives a throttling pulse, the CPU speed is momentarily reduced. The length of time the CPU speed is reduced is aligned with the time the building's incoming voltage is at its minimum value. The reduced CPU time corresponds to the time of increased current demand of the distorted waveform 312. In this example embodiment, the throttling scheme does not randomly reduce the power consumption of the CPU over time as in conventional techniques, but instead uses the AC voltage waveform profile to reduce power consumption.

In different embodiments the power factor and AC voltage magnitudes are measured at different points along the power delivery chain and are not limited to the depiction in FIG. 5.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
   a timing signal block configured to be coupled to measure the magnitude of an alternating current voltage signal supplied to a processor and to assert a timing signal when the magnitude of the alternating current voltage signal is about equal to zero volts; and
   a throttling block configured to be coupled to the processor, to receive the timing signal and to assert a throttling signal that causes processor speed to be reduced so that processor power consumption is reduced in phase with the alternating current voltage signal and harmonic distortion of a current waveform supplied to the processor is reduced.

2. The apparatus of claim 1 further comprising:
   a voltage reference block configured to generate a reference level signal having a magnitude determined by the actual power factor of the power supplied to the processor.

3. The apparatus of claim 2, wherein the timing signal block further configured to assert the timing signal when the magnitude of the alternating current voltage signal is about equal to the magnitude of the reference level signal.

4. The apparatus of claim 3 where the voltage reference block further comprises:
   a power factor measurement block configured to measure the actual power factor of the power supplied to the processor.

5. The apparatus of claim 4 further comprising:
   a reference power factor block that outputs a signal indicating the magnitude of a reference power factor.

6. The apparatus of claim 4, further comprising:
   a comparator, coupled to receive the signal from the reference power factor block, that outputs the reference signal.

7. The apparatus of claim 1 where:
   the timing signal is asserted as a pulse having a specified duration.

8. The apparatus of claim 1 where:
   the reference level signal is a reference voltage level signal.

9. A method for reducing power consumed by a processor comprising:
   measuring the magnitude of an alternating current voltage signal supplied to a processor;
   asserting a timing signal when the magnitude of the alternating current voltage signal is about equal to zero volts; and
   throttling the processor to reduce processor speed when the timing signal is asserted so that processor power consumption is reduced in phase with the alternating current voltage signal and harmonic distortion of a current waveform supplied to the processor is reduced.

10. The method of claim 9 further comprising:
    measuring the actual power factor of power supplied to the processor.

11. The method of claim 10 further comprising:
    generating a reference level signal having a magnitude determined by the actual power factor of the power supplied to the processor.

12. The method of claim 11 further comprising:
    asserting the timing signal when the magnitude of the alternating current voltage signal is about equal to the magnitude of the reference level signal.

13. The method of claim 9 where:
    the reference level signal is a reference voltage level signal.

14. A system for reducing power consumed by a processor comprising:
    means for measuring the magnitude of an alternating current voltage signal supplied to a processor;
    means for asserting a timing signal when the magnitude of the alternating current voltage signal is about equal to zero volts; and
    means for throttling the processor to reduce processor speed when the timing signal is asserted so that processor power consumption is reduced in phase with the alternating current voltage signal and harmonic distortion of a current waveform supplied to the processor is reduced.

15. The system of claim 14 further comprising:
    means for measuring the actual power factor of power supplied to the processor.

16. The system of claim 15 further comprising:
    means for generating a reference level signal having a magnitude determined by the actual power factor of the power supplied to the processor.

17. The system of claim 16 further comprising:
    means for asserting the timing signal when the magnitude of the alternating current voltage signal is about equal to the magnitude of the reference level signal.

18. The system of claim 14 where:
    the reference level signal is a reference voltage level signal.

19. The system comprising:
    a chipset;
    a throttling block coupled to the chipset that reduces power consumed by the chipset in phase with an alternating current voltage signal supplied to the chipset;
    a timing signal block configured to be coupled to measure the magnitude of an alternating current voltage signal supplied to a processor and to assert a timing signal when the magnitude of the alternating current voltage signal is about equal to zero volts,
    wherein the throttling block is configured to be coupled to the processor, to receive the timing signal and to assert a throttling signal that causes processor speed to be reduced so that processor power consumption is reduced in phase with the alternating current voltage signal and harmonic distortion of a current waveform supplied to the processor is reduced.

* * * * *